Feb. 12, 1957 A. W. HOGE 2,781,300
ADDING MAKE-UP CATALYST
Filed April 24, 1952
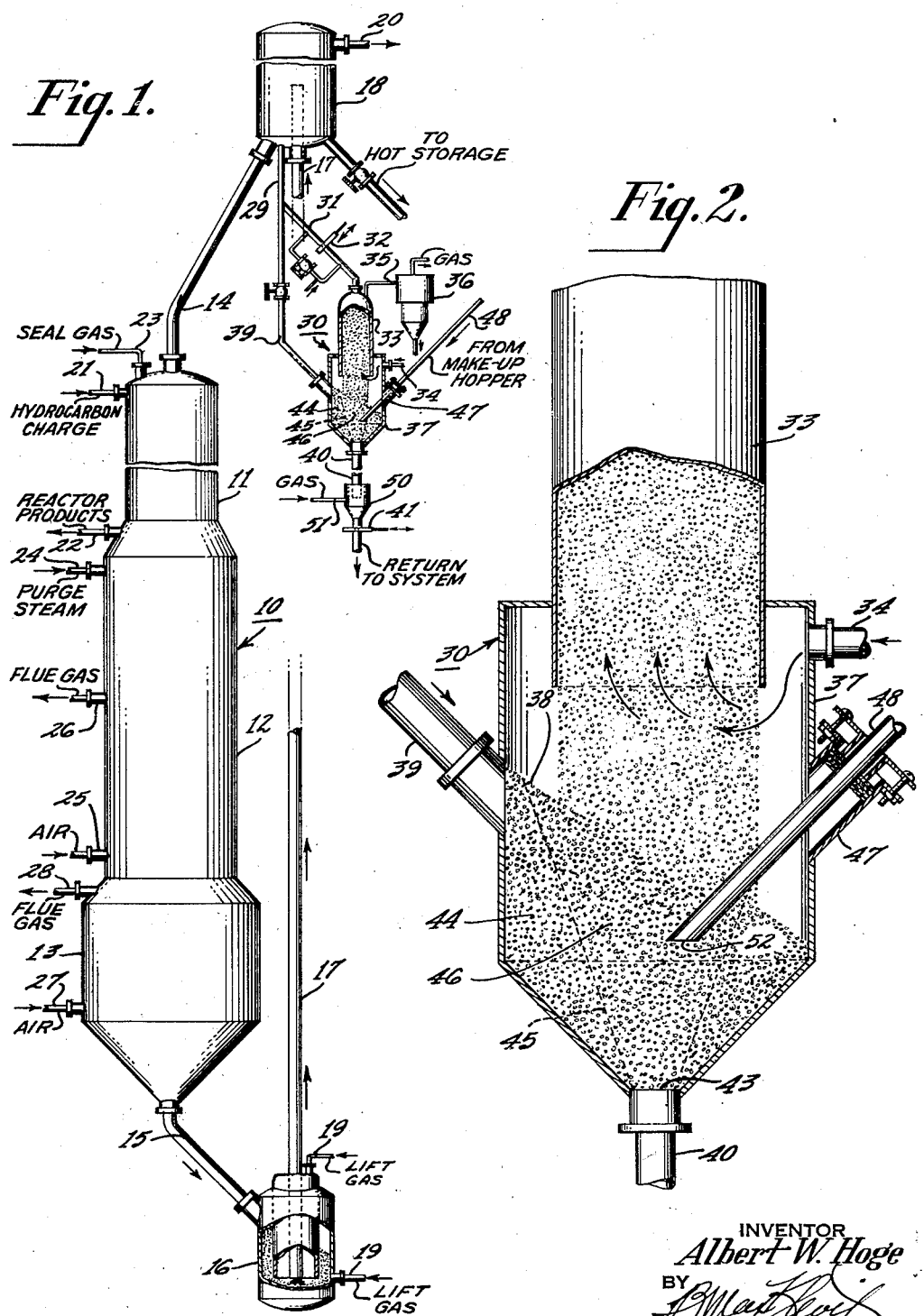

United States Patent Office 2,781,300
Patented Feb. 12, 1957

2,781,300

ADDING MAKE-UP CATALYST

Albert Wesley Hoge, Ridley Park, Pa., assignor to Houdry Process Corporation, Wilmington, Del., a corporation of Delaware Application April 24, 1952, Serial No. 284,181

10 Claims. (Cl. 196—52)

This invention relates to moving, compact bed, reaction systems, such as hydrocarbon conversion systems, using, for example, granular catalyst or other porous or adsorbent contact mass. The invention concerns especially the addition of regulated and adjustable quantities of contact mass to a circulating stream of it, generally to replace removed portions, and with substantial avoidance of adverse effect on the physical condition and activity of the catalyst.

In such a system the granular contact mass, say a catalytic one, descends along a downflow-pass as a compact bed or beds through one or more fluid contacting zones, and from the bottom of the downflow-pass is elevated to a higher (or starting) level then to repeat its downward movement. In typical hydrocarbon conversion systems, the fluid contacting zones generally comprise a hydrocarbon conversion zone where the hydrocarbon charge contacts the granular mass, and a heating or regeneration zone where the granular mass, for example, carrying coke deposit, is contacted with oxygen-containing gas to effect combustion of the coke.

In such systems it is usually necessary to add a minor amount of contact material to the circulating stream, in part at least to replace what is removed, for example, as fines resulting from attrition; or as with a catalytic granular mass that undergoes extremely little attrition, to replace used granular material with fresh catalyst or material of higher activity, to enable maintaining a desired equilibrium activity.

The invention provides particularly improvements in the manner of adding the so-called "make-up" catalyst or other contact material that thus needs to be introduced into the circulating system. Since the problems that arise in a system using a catalytically active contact mass are more pronounced, as it is the more costly type, addition of make-up catalyst is selected as the illustration in the fuller description which follows, but with no intent thereby to limit the invention which is applicable as well to the addition of non-catalytic material lost by attrition or otherwise.

In circulating systems of the type concerned, the contact mass (catalytic or otherwise) is held at, or subjected to, such high temperatures as 800° F. and higher. A major problem currently arising in such systems is that stemming from attrition of the granules, especially in the systems using a gas lift to elevate them to the starting level of the downflow pass of their circulation. Of the many and varied elements that give rise to the entire amount of attrition occurring in the system, it has now been found that an important part of it stems from the prevailing methods of introducing make-up catalyst.

In the earlier, and still used, systems having bucket elevators, and their like, to elevate the catalyst, the practice has been, and still is, periodically to withdraw fresh catalyst from its storage and feed it to the elevator carrying the coke-containing catalyst (discharged from the hydrocarbon reactor) to the top of the regenerating kiln. Sometimes, before thus adding it, the fresh catalyst, or a part of it, is put through a separate heating step wherein it is contacted by heated air or other hot gas. Even in the systems wherein the gas lift was incorporated in place of mechanical (e. g. bucket) elevators, similar methods for adding make-up catalyst were used, that is batchwise over a comparatively short period, one to several hours. Thus, during the period of such addition there may be introduced into the circulating stream of catalyst, a localized concentration of it differing in temperature, activity, or otherwise, from the re-circulating general bulk of catalyst of the system. This unevenness often causes erratic operation and/or flow irregularities, chiefly manifested by serious after-burning in flue gas lines or elsewhere, insufficient heating of catalyst in the kiln, which subsequently may be reflected in the reactor by condensation of hydrocarbon liquid on the catalyst, or absorption of unconverted oil in it, abnormal coke deposition, or general disturbance of normal kiln operation and maintenance of efficient heat balance.

Also in the systems having a gas lift, at times the make-up catalyst was introduced into the catalyst hopper at the foot of the gas lift. In this method additional difficulties develop from the pressure differential between the make-up catalyst supply source and the lift hopper. This pressure differential involves an adverse pressure gradient in the catalyst line supplying the lift hopper, which increases the tendency or possibility of hold-up in catalyst flow. Under such conditions, abnormally large slugs of catalyst, cooler than or differing otherwise from the main body of circulating catalyst, may be admitted into the system with serious consequences manifested by abnormally high attrition and otherwise. This may account in part for previously inexplicable or unaccounted for difficulties that occurred in operation.

In an average system of the mechanical elevator type, using clay catalyst circulating at approximately 100 tons per hour, rate of catalyst make-up is about 2–3 tons daily, added batchwise, often once a day or somewhat more often, and usually over a period of not more than several hours. In that way, during the make-up period in the order of ⅔% to 1.5% of freshly added make-up catalyst may be present in the circulating body of catalyst entering the kiln. The percentage of fresh make-up catalyst in the entire circulating amount is also of about this same order in the units that use a gas lift, and of a capacity having a typical catalyst circulation rate of about 200 to 250 tons per hour, and even when the hardier or more resistant gel bead catalyst is used.

Recognizing the inherent difficulty of adding comparatively small controllable amounts of make-up catalyst to a circulating mass of catalyst through a valve or orifice plate, it has previously been proposed to control the rate of catalyst addition by a mechanical metering device. In such arrangements the make-up catalyst can be brought separately into the main stream of circulating catalyst at some selected appropriate location, or, if the system includes an elutriator for removal of undersized particles and fines from the principal circulating mass, the make-up catalyst can be admixed with the coarse particles being returned to the system, for instance by bringing the make-up catalyst line into or above the bed of catalyst maintained in the bottom of the elutriator.

According to the present invention, smoother operation, with practical overcoming of the problem of thermal shock to the catalyst and effective admixture of fresh catalyst with that circulating through the system, much lower attrition rates and improved overall performance in catalyst circulation and functioning of the system are obtained. These advantages result from running the make-up feed line into the elutriator and placing its outlet directly within the cone of active catalyst flow in the bed of catalyst in the elutriator, and beneficially within that active flow cone at a location spaced inwardly from the invisible boundary between the non-moving or relatively stagnant catalyst and the actively descending catalyst. Then, the rate of supply of catalyst from the make-up feed line is controlled by the level of its outlet in the active flow cone, for the ratio of the transverse cross-sectional area of the feed line to the horizontal cross-sectional area of the active flow cone increases as the position of the outlet is lowered in the cone.

Thus, the rate of supply of make-up catalyst can be varied, as desired, by raising or lowering the height of its outlet in the active flow cone of catalyst in the elutriator. This is done by running the make-up feed line into the elutriator through a gas-tight fitting, such as a packing gland. That and a telescoping section of feed pipe permits increasing or shortening, as desired, the length of the make-up feed line extending into the elutriator. Increasing that length lowers the feed line outlet in the active flow cone thereby increasing the make-up supply rate, while withdrawing more of that feed line shortens its length in the elutriator and raises the level of its outlet in the active cone thereby decreasing the rate of feed of make-up. At least usually in practice adjustment is rather infrequent, so that it is preferable to use a short section of pipe of a length to fix the feed line outlet at the desired level in the active flow cone. Then to alter the rate of feed of make-up that section can be replaced by another section of the required length for the newly desired supply rate, in a fairly short time.

It is advantageous to feed the make-up catalyst at a relatively uniform low rate continuously into the active flow cone in the catalyst bed in the elutriator, or semi-continuously at a sufficiently low rate that catalyst is fed during at least one half of the day.

The operation of the method and apparatus of the invention and the relative numerical changes in the make-up supply rate with changes in elevation of the outlet of its feed line in the active flow cone in the elutriator bed of catalyst, and the already mentioned and other advantages of the invention are more fully developed in the more detailed description that follows, considered together with the accompanying drawings illustrative of the invention.

In the drawings: Figure 1 shows, in elevation and foreshortened, a primarily schematic view of a hydrocarbon conversion system operating with a gas lift; and Figure 2 is, in elevation, an enlarged fragmentary view of the elutriator with portions broken away to disclose, among others, the internal relationship between the make-up feed line and the active flow cone of catalyst.

In Fig. 1, there is shown a unitary vessel 10 having 3 supermounted sections each lower one of progressively increasing diameter, and comprising principally a reaction zone 11 as the topmost and narrowest section, an upper kiln or regenerator section 12 and a lower kiln or regenerator section 13 as the intermediate and bottom sections respectively. A catalyst inlet conduit 14 leads into the top of section 11 and a catalyst discharge conduit 15 leads down from the bottom of section 13 and into the upper end of a catalyst transfer or lift hopper 16. Rising substantially vertically through and from the top of hopper 16 is a lift pipe 17 extending to a level above the top of vessel 10 and entering through the bottom of a gas/solids separator or disengager hopper 18.

In operation, catalyst discharged from the lowermost zone of the kiln section 13 descends as a compact column through conduit 15 into transfer hopper 16 forming a bed therein. Introduction of a lift gas into hopper 16, as by one or more supply lines 19 or in other manner known to the art (see "New houdriflow cracking unit," Petroleum Processing, June 1950, beginning at page 601), elevates the catalyst from the bed in hopper 16 into and through lift pipe 17. Then catalyst and lift gas discharge into separator 18, where the gas is withdrawn overhead as by means of a line 20 while the catalyst is principally discharged at the bottom of the separator through conduit 14 to repeat the cycle.

In its downflow pass and while descending as a compact mass through the vessel 10, the catalyst is contacted in the reactor section 11 with hydrocarbon charge which thereby is converted into conversion products by the catalyst. The charge is introduced, in vapor, liquid or mixed phase, through one or more supply lines 21.

Conversion products are disengaged from catalyst at the bottom of reactor section 11 and discharged through a line 22 to further processing or appropriate fractionation equipment, not shown. Seal gas line 23 allows the introduction of seal gas, such as steam, into the top of the reactor, and a portion of the seal gas flows upwardly through conduit 14 and maintains a pressure seal in it in known manner.

The catalyst, containing hydrocarbonaceous deposit or "coke" accumulated as a result of hydrocarbon conversion reactions in section 11, in its further descent through vessel 10 passes through a purging zone wherein it is contacted with steam or other purge gas admitted through line 24, and the thus purged catalyst then passes through one or more seal pipes (not shown) into the top of the regenerator section 12. There the coke-containing catalyst gravitating through as a compact bed, is contacted with countercurrently flowing regenerating gas, which may be air or other oxygen-containing gas, admitted at the bottom of that section through a supply line 25, the combustion products being withdrawn as flue gas through a discharge line 26 from the upper portion of section 12. The flue gas may be sent to a discharge stack or all or a portion of it may be utilized as desired or required in other portions of the system.

In the lower regenerating section 13 the catalyst is subjected to a further stage of regeneration by countercurrent contact with more regenerating gas admitted at the bottom of that section by a supply line 27; flue gas being discharged at the top of that section through line 28. This gas may be disposed of in a manner similar to that mentioned for the flue gas discharged through line 26. The regeneration may be carried out in more than the illustrated two stages by providing additional regeneration sections similar to sections 12 and 13. Appropriate heat exchange devices (not shown) may be provided in the regenerator sections or between them to control maximum temperature.

To withdraw from the system dust and particles of less than smallest desired size, a predetermined portion of the catalyst discharged into separator 18 is by-passed through a line 29 into an elutriating device shown generally at 30. In its operation, as shown in Fig. 1, the catalyst from the line 29 enters the elutriator 30 through a branch line 31 at a predetermined rate under the control of an orifice plate, slide valve or other flow regulating device, 32.

Referring now also to Fig. 2 which shows the major part of the elutriator enlarged, the branch line 31 discharges into the upper or separating section 33 of the elutriator as a freely falling stream of particles which are traversed in section 33 by a countercurrently flowing gas stream admitted into the bottom of that section from supply line 34. The gas stream passing upwardly through the elutriator section 33 picks up dust and the more finely divided particles. These are then discharged with the gas through the line 35 into a cyclone 36 (Fig. 1) or other device for removing fine solid particles from gas. The coarser particles discharge from the upper elutriator section 33 into an enlarged hopper portion 37 below it to form in the hopper a compact bed maintained at a level, as indicated at 38, located below the bottom of the narrower elutriator (separating) section 33. This bed level is maintained regardless of the amount of catalyst entering the elutriator through line 31 by a separate supply of catalyst to the hopper 37, as will be next explained.

Referring again to Fig. 1, it is seen that hopper section 37 is supplied directly by a branch line 39 communicating with line 29 so that irrespective of the amount of catalyst entering the elutriator through line 31 under the control of device 32, the bed level in hopper section 37 is maintained substantially constant since the flow of catalyst into it through line 39 is controlled by the rate that catalyst is discharged from the bottom of hopper section 37.

From the hopper section 37, the recovered coarser particles of catalyst, freed of fines in the elutriator, are returned to the main body of catalyst in the circulating system, as by means of a discharge line 40 communicating with any appropriate location in the main circulating catalyst system. This can be a catalyst free space provided above the catalyst level in regenerating section 12 of the vessel 10, or some other suitable place. The rate of return of catalyst to the main body of catalyst in the circulating system, and accordingly the rate of withdrawal of catalyst from hopper 37, is controlled by an orifice plate, chopper valve or other suitable flow control device 41. This device, it is to be understood, is designed or adjusted to permit the passage of catalyst through it at a rate slightly in excess of that at which catalyst can pass through the control device 32 in line 31. The difference in the rate of flow of catalyst through the device 32 and the device 41 is made up by the amount of catalyst that will be passed into the hopper section 37 through the branch line 39, and/or by catalyst entering the line 40 above the flow control device 41 from some other source.

The method of adding make-up catalyst to the system by feeding it directly into the active flow cone in the bed 38 of catalyst in the elutriator, according to the invention, can be seen from consideration of the elutriator 30 in Figure 1 and its enlargement in Figure 2. The catalyst granules in the bed 38 in the lower enlarged or hopper section 37 of the elutriator are discharged through the exit orifice or outlet 43 into the discharge line 40, and the granules leave the bed from a zone having in effect largely the form of an inverted cone with its axis coincident with the upward extension of the axis of line 40 and its peripheral boundaries being determined by the normal angle of flow of the granular particles. Thus there exists in the bed 38 of catalyst a non-moving or practically stagnant portion 44 between an inverted frusto-conical cylinder of catalyst bounded by the dash lines 45 and the peripheral sides of the hopper section 37, with the non-moving portion 44 surrounding a virtual cone 46 of active catalyst flow in and from the bed 38.

From one part of the outer wall of the hopper section 37 there extends outwardly upwardly a projection 47 communicating with the interior of section 37, and through which there projects into the elutriator 30 and into the active flow cone 46 the make-up supply line 48 leading from the make-up storage or hopper (not shown) and passing in fluid-tight fit through the packing gland 49 in the outer end of the projection 47. The packing gland allows further insertion, or desired withdrawal, of the make-up catalyst supply line 48 to adjust its position at any desired level within the active flow cone.

In the operation of this modification of the elutriator to provide for the introduction of make-up catalyst, the latter coming from its storage bin or hopper feeds by gravity through its supply line 48 directly into the active flow cone 46 in the catalyst bed 38 in the lower or hopper section 37 of the elutriator. Arriving in the flow cone 46 the granules of make-up catalyst are readily commingled with catalyst granules entering through line 39 and those freed of fines dropping from the upper or separating section 33 into the flow cone 46 so that a substantially uniform mixture of make-up and re-circulated granules is discharged through the exit orifice 43 into the discharge line 40.

The mixture of make-up and re-circulated fines-freed catalyst flows through the initial short length of line 40 which extends below the top of, and into, the enlarged section 50 to provide a space free of solids above the small bed of catalyst thus maintained in the enlarged section. Through a line 51, gas in small amounts, as by being bled through a throttle valve, is supplied to this solids-free space, thereby providing a positive flow of gas through device 41 overcoming any adverse pressure gradient that could otherwise develop by flow of gas through that device in the opposite direction. This gas supplied to line 51 may be flue gas by-passed from the kiln section 12, or air or other gas from an independent source, provided that such gas is not incompatible in the zone into which it is discharged with the catalyst in line 40. Positive flow of gas concurrently with the catalyst through orifice 41 is advantageous for it serves to maintain a fairly uniform feed of catalyst through this orifice while the catalyst is flowing through line 40 and tends to prevent catalyst holdup due to bridging in that line.

The mixture of make-up and previously used fines-freed catalyst then continues through the lower and longer part of line 40 to be returned to the main body of catalyst being circulated about the system, for example, into the catalyst-free space above the catalyst level in regenerator section 12 of vessel 10, or into the catalyst transfer or lift hopper 16, or some other suitable zone of the system.

The relationship of the make-up feed rate to the ratio of the cross-sectional area of the make-up supply line to that of the active flow cone at the level of the outlet feed line, and the varying of the make-up feed rate by adjusting the elevation of the supply line outlet in the flow cone is illustrated thus:

Assume the inside diameter of make-up supply line 48 is three inches, and the diameter of the active flow cone 46 at the level of the supply line outlet 52 is twenty inches. Then the ratio of the cross-sectional area of the supply outlet to that of the cone at the outlet level is 7.1 to 314 or about 1 to 44. Then if the total rate of discharge of catalyst through the discharge outlet 43 at the bottom of the compact bed in the elutriator is twelve tons per hour, the rate of make-up addition will be one forty-fourth of twelve or about 0.27 ton per hour. Then for a make-up demand of about three tons per day, make-up catalyst can be fed through supply line 48 for about twelve hours of the day. It will be understood that these figures are theoretical and approximate since the "flow cone" does not necessarily have an exact lateral surface or wall defining a boundary between a zone of flow and an adjacent zone of no flow.

Now, if supply line 48 is withdrawn along its longitudinal axis until its outlet 52 is at a higher level where the diameter of the active flow cone is say twenty-eight inches, then the ratio of the areas will be 7.1 to 615 or about 1 to 86.5. Thus, with the same catalyst discharge rate from the elutriator, make-up catalyst would be fed through supply line 48 at a rate of about 0.14 ton per hour.

Alternatively, if make-up catalyst were required at this same rate of 0.14 ton per hour, supply line 48 could be kept at the same level as first shown (say as in Figure 2) but replaced by the same length of pipe of smaller diameter to give the same ratio of 1 to 86.5 at the original lower level.

In a certain operation of the system, for some reason it might be desired to add a large quantity of make-up catalyst, for example, to raise the average equilibrium activity of the catalyst throughout the system. That could be accomplished readily by closing valve 53 in the elutriation by-pass line 39 thereby establishing the level of bed 38 in the hopper section 37 by the level of the outlet 52 of make-up supply line 48. Then the ratio of make-up catalyst to elutriated catalyst would be determined by the relative amount of used fines-freed catalyst granules falling freely from the elutriator separating section 33.

In arrangements according to the invention, as shown in the drawings, wherein fresh make-up catalyst, which may be relatively cool, is fed into elutriated catalyst freed of fines and ready to be returned to the system, such make-up catalyst is well distributed in the system by being initially admixed with the fines-freed used catalyst from the elutriator and then supplied as such admixture to the main body of circulating catalyst. This avoids any tendency to produce a localized concentration of cool, fresh make-up catalyst near the zone of its introduction into the main system. Moreover, by feeding the make-up catalyst into the active flow cone in the elutriator, the relatively cool make-up catalyst, often containing pick-up moisture, is safely preheated in it under conditions less likely to cause thermal shock to the fresh catalyst with attendant weakening of its physical structure, than in cases where the fresh make-up catalyst is added directly to a regeneration zone, or to certain other places in the system where the catalyst would encounter conditions effecting more rapid or more drastic heating. Since the quantity of elutriated catalyst being regularly returned to the system is relatively large as compared with the amount of fresh make-up catalyst supplied to the system, a control valve such as the orifice plate 41 associated with the positive pressure supply chamber as shown at 50 and 51 in Figure 1, is at least usually adequate for controlling the supply of the mixture of elutriated and make-up catalyst to the system.

While the invention has been described in relation to certain specific embodiments of it, it is understood that various modifications and substitutions can be made in them within the scope of the invention as covered in the appending claims which are also intended to cover equivalents of these embodiments.

What is claimed is:

1. In a hydrocarbon conversion system in which a body of granular contact material is continuously circulated, with resultant production of fines requiring removal from said body, which fines are removed from said body by the steps of continuously withdrawing a minor portion thereof, passing said withdrawn portion into an elutriating zone wherein said fines are separated from the coarser particles of contact material and removed, accumulating the elutriated coarse particles as a compact moving bed maintained at a constant level beneath said elutriating zone and in such position as to receive the elutriated particles by free fall to the surface thereof, and passing said coarse particles as a first compact moving stream from the bottom of said bed to a selected lower location within said circulating body, the flow of solids constituting said moving bed being maintained as an inverted cone of solids flow having diminishing flow area ultimately converging to form said first stream; the method of introducing regulated and controllable quantities of fresh make-up contact material to said circulating body as replacement for the elutriated material removed as fines which comprises: introducing said make-up material as a downwardly-discharging second compact moving stream directly into said cone of solids flow at a selectively controlled level therein, whereby the proportion of make-up material to retained coarser material which together constitute said first stream is determined by the ratio of the cross-sectional flow areas of said second stream and said retained material flowing in said cone of solids flow at said selected level.

2. In a method as defined in claim 1, the method of adjusting the ratio of make-up contact material to retained coarser material in said first compact moving stream which comprises the step of varying the level at which said second compact moving stream is introduced downwardly within said cone of solids flow in said compact moving bed, whereby said ratio is increased by introducing said make-up material at a lower level and is decreased by introduction at a higher level.

3. A method as in claim 1 wherein said contact material is granular catalyst effective in promoting said conversion.

4. In a system wherein a body of granular contact material subject to attrition is continuously circulated through a reaction zone, and a minor portion of such material is continuously bypassed through an elutriating zone for removing undersize particles and fines therefrom, said system including means for supplying a controlled minor portion of the circulating material for gravitational movement through said elutriating zone countercurrently to an upwardly moving stream of elutriating gas, an accumulating hopper directly beneath said elutriating zone for receiving the coarser particles of contact material not removed by said elutriating gas, conduit means for bypassing an additional portion of the contact material in the form of a compact moving stream directly to said hopper, without passing through said elutriating zone, so as to maintain a compact moving bed of granular material at a constant level within said hopper, and a granular material discharge outlet at the bottom of said hopper adapted to restrict the rate of discharge therefrom, the combination therewith of means for supplying fresh contact material to such system comprising: a conduit for supplying fresh contact material from an external source to said hopper, means in the wall of said hopper adapted to slidably receive said conduit in sealing engagement, and means for longitudinally extending and retracting said conduit so as to vary the location of its discharge end within said hopper.

5. Apparatus as as defined in claim 4 in which the longitudinal movement of said conduit is such as to maintain its discharge end constantly within the cone of solids flow within said compact moving bed and extending upwardly from said discharge outlet.

6. Apparatus as in claim 5 in which said conduit for supplying make-up material extends downwardly through the side wall of said hopper at an angle to the vertical, whereby the longitudinal movement of said conduit displaces its discharge end both horizontally and vertically within said cone of solids flow.

7. In a catalytic reaction system in which granular catalyst is continuously circulated along a confined path including a by-pass portion containing an elutriator for the removal of fines, the combination of: an upright elongated vessel comprising an upper elutriator section and a lower expanded hopper section, catalyst inlet means at the upper end of said elutriator section for introducing as a free-falling stream a controlled amount of catalyst by-passed from said confined path, a second catalyst inlet means for introducing additional by-passed catalyst into said hopper section at a level spaced below the lower end of said elutriator section, catalyst outlet means at the bottom of said hopper section for withdrawing catalyst at a controlled rate adapted to maintain a continuous compact moving mass of catalyst gravitating as a bed within the lower region of said hopper section and as a column within said second catalyst inlet means, said free-falling catalyst being deposited on the central surface area of said bed, gas inlet means at the upper end of said expanded hopper section communicating with the catalyst-free region surrounding said free-falling catalyst stream, gas outlet means at the upper end of said elutriator section for withdrawing said gas together with entrained fines, and a third catalyst inlet means comprising a conduit extending into said hopper section and being arranged to introduce a compact moving stream of fresh make-up catalyst downwardly within said bed at a subsurface location therein included within the cone of solids flow extending upwardly into said bed from said catalyst outlet means.

8. Apparatus as defined in claim 7 including means associated with said third catalyst inlet means for determining the ratio of the horizontal areas of the make-up stream of catalyst at its introduction level and the cone of solids flow at said level.

9. Apparatus as defined in claim 8 in which said means associated with said third catalyst inlet means determines said ratio by adjustment of the level of discharge of said conduit for introducing make-up catalyst.

10. Apparatus as defined in claim 7 in which the catalyst introduced by free fall into said elutriator section from the first catalyst inlet means and the catalyst introduced as a compact moving stream into said hopper section from said second catalyst inlet means are supplied from a single stream of catalyst by-passed from the main portion of said confined path.

References Cited in the file of this patent

UNITED STATES PATENTS

| | | |
|---|---|---|
| 2,531,192 | Bergstrom | Nov. 21, 1950 |
| 2,567,207 | Hoge | Sept. 11, 1951 |
| 2,656,306 | Bergstrom et al. | Oct. 20, 1953 |
| 2,704,740 | Oblad et al. | Mar. 22, 1955 |

OTHER REFERENCES

"Houdriflow," Oil and Gas Journal, Jan. 13, 1949, vol. 47, pages 78 and 79.